US012450843B2

(12) United States Patent
Hajas et al.

(10) Patent No.: US 12,450,843 B2
(45) Date of Patent: Oct. 21, 2025

(54) CONFIGURABLE EXTREMITY VISIBILITY

(71) Applicant: Apple Inc., Cupertino, CA (US)

(72) Inventors: Peter L. Hajas, Lafayette, CO (US);
Sebastien Metrot, Paris (FR); Michael
E. Buerli, San Francisco, CA (US);
Michael A. Reiter, San Francisco, CA
(US); Diego Trazzi, Mountain View,
CA (US); Conner J. Brooks, San
Francisco, CA (US); Jacob Wilson, San
Francisco, CA (US)

(73) Assignee: Apple Inc., Cupertino, CA (US)

( * ) Notice: Subject to any disclaimer, the term of this
patent is extended or adjusted under 35
U.S.C. 154(b) by 190 days.

(21) Appl. No.: 18/382,045

(22) Filed: Oct. 19, 2023

(65) Prior Publication Data
US 2024/0428527 A1 Dec. 26, 2024

Related U.S. Application Data

(60) Provisional application No. 63/522,123, filed on Jun. 20, 2023.

(51) Int. Cl.
G06T 19/00 (2011.01)
G06T 7/10 (2017.01)
G06T 7/70 (2017.01)
G06V 20/64 (2022.01)

(52) U.S. Cl.
CPC ............. *G06T 19/006* (2013.01); *G06T 7/10* (2017.01); *G06T 7/70* (2017.01); *G06V 20/64* (2022.01)

(58) Field of Classification Search
None
See application file for complete search history.

(56) References Cited

U.S. PATENT DOCUMENTS

| | | | | |
|---|---|---|---|---|
| 2011/0252160 A1* | 10/2011 | Wu | ........................ | G06F 40/154 707/769 |
| 2016/0192016 A1* | 6/2016 | Peterson | ............ | H04N 21/4318 725/41 |
| 2023/0298347 A1* | 9/2023 | Tarashima | .............. | G06T 7/246 382/181 |

* cited by examiner

Primary Examiner — Tapas Mazumder
(74) Attorney, Agent, or Firm — BAKERHOSTETLER

(57) ABSTRACT

A device may include a processor configured to receive, by a system process and from an application process, a visibility preference for an object type and segment one or more physical objects associated with the object type from an image of a physical environment. The processor is also configured to determine, by the system process, whether to display the one or more segmented physical objects based at least in part on the visibility preference. In response to a determination display the one or more segmented physical objects, the processor is configured to display at least a portion of the image corresponding to the one or more segmented physical objects. In response to a determination not to display the one or more segmented physical objects, the processor is configured to forgo displaying that at least a portion of the image corresponding to the one or more segmented physical objects.

20 Claims, 6 Drawing Sheets

CONFIGURABLE EXTREMITY VISIBILITY

CROSS-REFERENCE TO RELATED APPLICATIONS

The present application claims the benefit of U.S. Provisional Patent Application Ser. No. 63/522,123, entitled "CONFIGURABLE EXTREMITY VISIBILITY," filed Jun. 20, 2023, which is hereby incorporated herein by reference in its entirety and made part of the present U.S. Utility Patent Application for all purposes.

TECHNICAL FIELD

The present description relates generally to electronic devices including, for example, configurable extremity visibility settings in extended reality environments.

BACKGROUND

Augmented reality technology aims to bridge a gap between virtual environments and a physical environment by providing a view of the physical environment that is augmented with electronic information. As a result, the electronic information appears to be part of the physical environment as perceived by a user.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
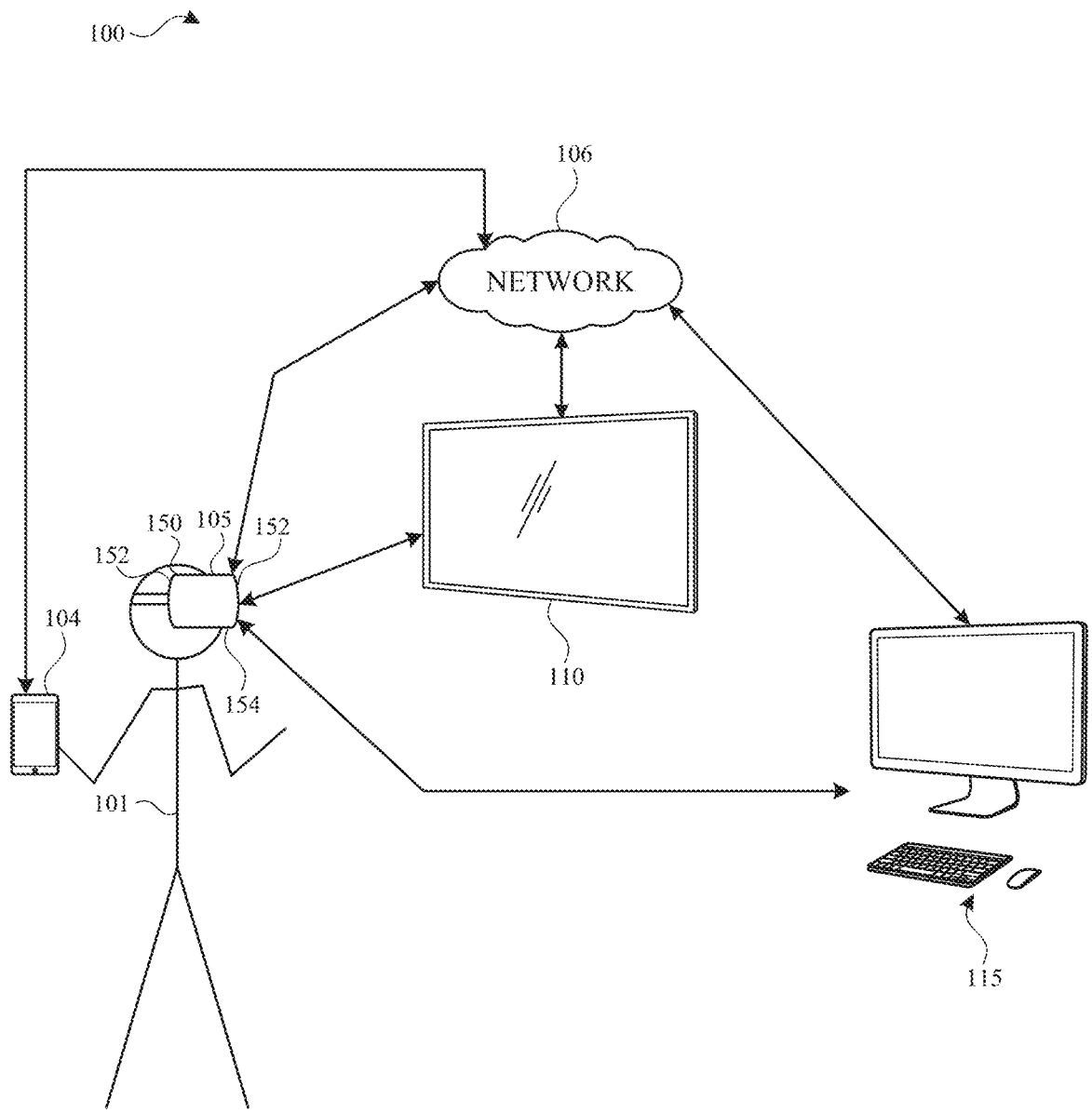
FIG. 1 illustrates an example system architecture including various electronic devices that may implement the subject system in accordance with one or more implementations of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina.

Projection systems also may be configured to project virtual objects into the physical environment, for example, as a hologram or on a physical surface.

Electronic systems may be configured to detect and/or identify one or more physical objects depicted in an image (e.g., one or more video frames), such as using computer vision object detection and/or classification techniques. For example, one or more machine learning models may be trained to detect different types of physical objects in images, such as video frames. In one or more implementations, the physical objects that may be identified by the electronic systems may include a user's extremities, such as a user's hands, arms, feet, legs, and the like. The identified physical objects may be matted, cropped, outlined, or otherwise segmented, for example, for compositing with one or more virtual objects. Identifying the physical objects may also allow users to view and perform interactions with their own extremities within an XR environment. Electronic systems may use high-definition cameras and/or infrared sensors, for example, to track the movement of the user's extremities in real-time. In some implementations, the sensor data allows the electronic system to build an accurate representation of the user's hand movements in three-dimensional space.

Additionally, electronic systems may generate one or more anchor points (e.g., fixed points in the real-world environment that are mapped onto the virtual or augmented reality), which serve as reference points in space for rendering and orientating virtual content to help the virtual content stay in a fixed location relative to the real-world environment, even when the user moves around. Anchor points may include a user's body, such as joints including elbows, wrists, or knuckles. Body-based anchor points, coupled with the skeletal tracking, may provide a more accurate and realistic depiction of the user's extremities in the XR environment. For example, if a user bends their elbow, the electronic system can track this movement relative to the anchor point, updating the virtual representation of the user's arm accordingly.

Lastly, the electronic device may render the XR environment, for example, by compositing the image (e.g., the one or more video frames) with the virtual content into a unified visual representation of the XR environment. In some implementations, the virtual content may be masked (e.g., alpha channel masked) according to the particular physical objects identified in the image, for example, to provide the appearance that the physical objects are nearer than the virtual content.

Implementations of the subject technology described herein provide a mechanism for enabling an application to specify a preference for the visibility of predetermined types of physical objects, such as a user's extremities (e.g., hands, feet, legs, and the like) in an XR environment. In one or more implementations, an application may indicate a preference for displaying pass-through images (e.g., video frames) of the predetermined types of physical objects, and/or for hiding the pass-through images of the predetermined types of physical objects. For example, an application operating in a virtual reality mode (e.g., a fully immersive virtual reality mode) may be configured to generate and/or render virtual images of the user's extremities (e.g., which may conflict with a display of the pass-through video of the user's extremities), and/or the application may otherwise have a preference for hiding the user's extremities. The electronic system may decide whether to implement the preference of the application. This mechanism helps facilitate a smooth interchange between a tailored user experience of an application with the natural, intuitive user experience of the electronic system.

These and other embodiments are discussed below with reference to FIGS. 1-6. However, those skilled in the art will readily appreciate that the detailed description given herein with respect to these figures is for explanatory purposes only and should not be construed as limiting.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, and an electronic device 115. For explanatory purposes, the system architecture 100 is illustrated in FIG. 1 as including the electronic device 105, the handheld electronic device 104, the electronic device 110, and the electronic device 115; however, the system architecture 100 may include any number of electronic devices, and any number of servers or a data center including multiple servers.

The electronic device 105 is illustrated in FIG. 1 as head-mounted portable system (e.g., worn by a user 101); however, the electronic device 105 may also be implemented, for example, as a tablet device, a handheld and/or mobile device. The electronic device 105 includes a display system capable of presenting a visualization of a computer-generated reality environment to the user. The electronic device 105 may be powered with a battery and/or another power supply. In an example, the display system of the electronic device 105 provides a stereoscopic presentation of the computer-generated reality environment, enabling a three-dimensional visual display of a rendering of a particular scene, to the user. In one or more implementations, instead of, or in addition to, utilizing the electronic device 105 to access a computer-generated reality environment, the user may use a handheld electronic device 104, such as a mobile device, tablet, watch, and the like.

The electronic device 105 may include one or more cameras such as camera(s) 150 (e.g., visible light cameras, infrared cameras, etc.). Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User input detected by such sensors and/or hardware elements correspond to, for example, various input modalities for performing one or more actions, such as initiating video capture of physical and/or virtual content. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

In one or more implementations, the electronic device 105 may be communicatively coupled to a base device (e.g., the electronic device 115). Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the computer-generated reality environment may be offloaded to the base device thereby reducing processing burdens on the electronic device 105. For instance, in an implementation, the electronic device 105 works in conjunction with the electronic device 115 to generate a computer-generated reality environment including physical and/or virtual objects that enables different forms of interaction (e.g., visual, auditory, and/or physical or tactile interaction) between the user and the generated computer-generated reality environment in a real-time manner. In an example, the electronic device 105 provides a rendering of a scene corresponding to the computer-generated reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The network 106 may communicatively (directly or indirectly) couple, for example, the electronic device 104, the electronic device 105, the electronic device 110, and/or the electronic device 115 with each other device. In one or more implementations, the network 106 may be an interconnected network of devices that may include, or may be communicatively coupled to, the Internet.

In FIG. 1, by way of example, the electronic device 110 is depicted as a television. The electronic device 110 may include a touchscreen and may be, for example, a television that includes a touchscreen, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a computer-generated reality environment. In one or more implementations, the electronic device 110 may include a touchpad. In one or more implementations, the electronic device 110, the handheld electronic device 104, and/or the electronic device 105 may be, and/or may include all or part of, the electronic device discussed below with respect to the electronic system discussed below with respect to FIG. 6. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 6.

Figure 2:
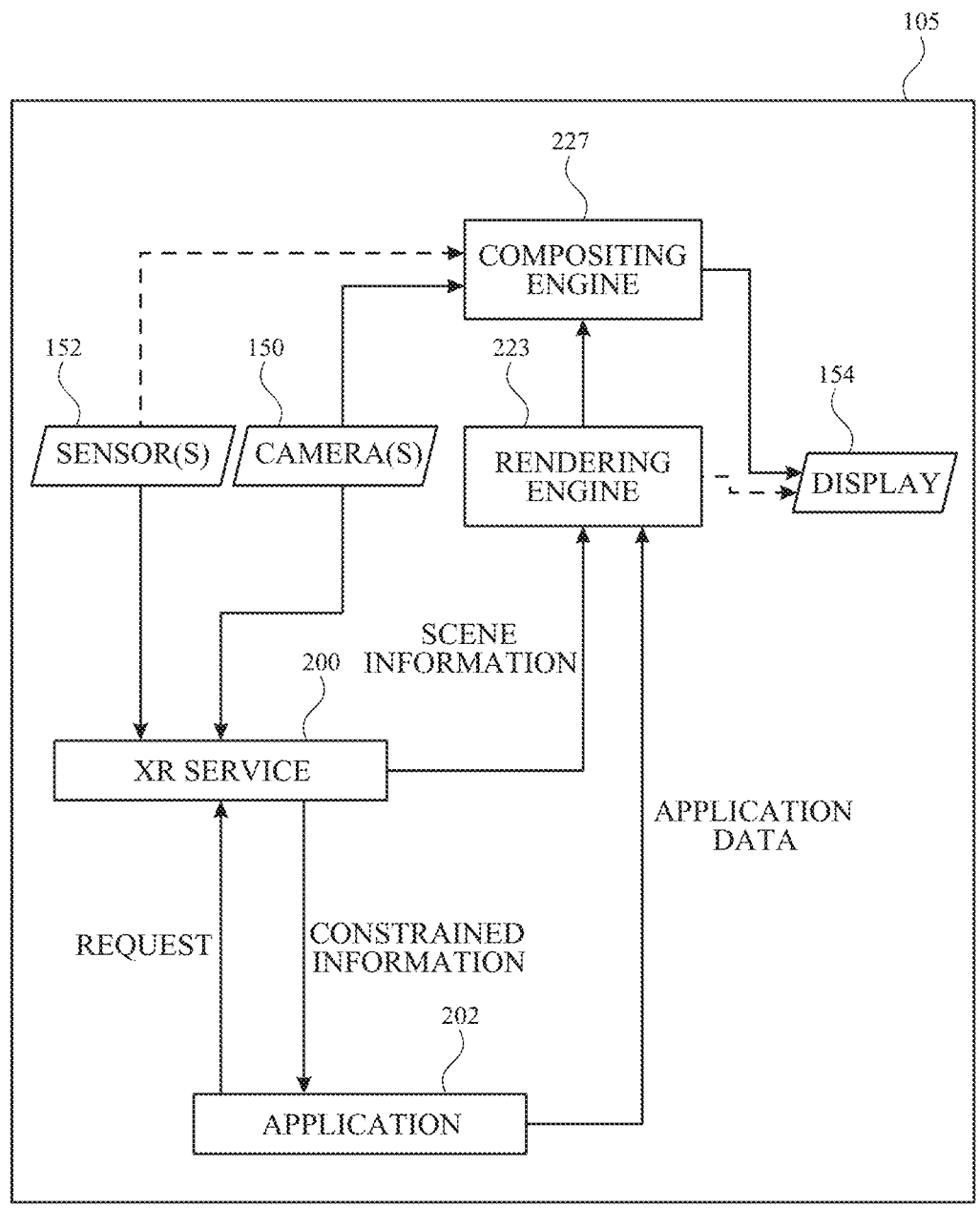
FIG. 2 illustrates an example electronic device that implements the subject system in accordance with one or more implementations of the subject technology.

FIG. 2 illustrates an example electronic device that implements the subject system in accordance with one or more implementations of the subject technology. For explanatory purposes, portions of the architecture of FIG. 2 are described as being implemented by the electronic device 105 of FIG. 1, such as by a processor and/or memory of the electronic device; however, appropriate portions of the architecture may be implemented by any other electronic device, including the electronic device 110, and/or electronic device 115. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 2 can be implemented in software or hardware, including by one or more processors and a memory device containing instructions, which when executed by the processor cause the processor to perform the operations described herein. For example, in FIG. 2, the trapezoidal boxes may indicate that, in one or more implementations, the sensors 152, the camera (s) 150 and the display 154 may be hardware components, and the rectangular boxes may indicate, in one or more implementations, that the XR service 200, the application 202, the rendering engine 223, and the compositing engine 227 may be implemented in software, including by one or more processors and a memory device containing instructions, which when executed by the processor cause the processor to perform the operations described herein.

In the example of FIG. 2, an application such as application 202 provides application data to a rendering engine 223 for rendering of the application data, such as for rendering of a UI of the application 202. Application 202 may be a gaming application, a media player application, a content-editor application, a training application, a simulator application, a social media application, or generally any application that provides a UI or other content for display at a location that depends on the physical environment, such as by anchoring the UI or other content to an anchor in the physical environment. The application data may include application-generated content (e.g., windows, buttons, tools, characters, images, videos, etc.) and/or user-generated content (e.g., text, images, etc.), and information for rendering the content in the UI. In one or more implementations, rendering engine 223 renders the UI of the application 202 for display by a display such as display 154 of the electronic device 105. In one or more implementations, the XR service 200 may assign a portion of a physical environment of the electronic device to the application 202.

As shown in FIG. 2, additional information may be provided for display of the UI of the application 202, such as in a two-dimensional or three-dimensional (e.g., XR) scene. In the example of FIG. 2, sensors 152 may provide physical environment information (e.g., depth information from one or more depth sensors, motion information from one or more motion sensors), and/or user information to an XR service 200. Camera(s) 150 may also provide images of a physical environment and/or one or more portions of the user (e.g., the user's eyes, hands, face, etc.) to XR service 200. XR service 200 may generate scene information, such as three-dimensional map, of some or all of the physical environment of electronic device 105 using the environment information (e.g., the depth information and/or the images) from sensors 152 and camera(s) 150. The XR service 200 may also determine a gaze location based on images and/or other sensor data representing the position and/or orientation of the user's eye(s). The XR service 200 may also identify a gesture (e.g., a hand gesture) performed by a user of the electronic device 105, based on images and/or other sensor data representing the position and/or orientation of the user's hand(s) and/or arm(s). The XR service 200 may also matte, crop, outline, highlight, or otherwise segment one or more objects from video images (e.g., from the cameras 150), which may be then composited by the compositing engine 227, for example, with virtual content (e.g., the output of the rendering engine 223).

As illustrated in FIG. 2, in one or more implementations, the application 202 may provide a request to the XR service 200. For example, the request may be a request for scene information (e.g., information describing the content of the physical environment), and/or a request for user information such as a request for a gaze location and/or user gesture information. In one example, the request may be an anchor request for a physical anchor (e.g., a horizontal surface, a vertical surface, a floor, a table, a wall, etc.). In another example, the request may be for one or more anchor points representing the location of one or more extremities of the user.

Application 202 may include code that, when executed by one or more processors of electronic device 105, generates application data, for display of the UI of the application 202 on, near, attached to, or otherwise associated with an anchor location corresponding to the anchor identified by the identifier provided from XR service 200. Application 202 may include code that, when executed by one or more processors of electronic device 105, modifies and/or updates the application data based on user information (e.g., a gaze location and/or a gesture input) provided by the XR service 200.

Once the application data has been generated, the application data can be provided to the XR service 200 and/or the rendering engine 223, as illustrated in FIG. 2. As shown, scene information can also be provided to rendering engine 223. The scene information provided from the XR service 200 to the rendering engine 223 can include or be based on, as examples, environment information such as a depth map of the physical environment, and/or object information for detected objects in the physical environment. Rendering engine 223 can then render the application data from application 202 for display by display 154 of electronic device 105 to appear at a desired location in a physical environment. Display 154 may be, for example, an opaque display, and camera(s) 150 may be configured to provide a pass-through video feed to the opaque display. The UI of the application 202 may be rendered for display at a location on the display corresponding to the displayed location of a physical anchor object in the pass-through video. Display 154 may be, as another example, a transparent or translucent display. The UI of the application 202 may be rendered for display at a location on the display corresponding to a direct view, through the transparent or translucent display, of the physical environment.

As shown, in one or more implementations, electronic device 105 can also include a compositing engine 227 that composites video images of the physical environment, based on images from camera(s) 150, for display together with the UI of the application 202 from rendering engine 223. For example, compositing engine 227 may be provided in an electronic device 105 that includes an opaque display, to provide pass-through video to the display. In an electronic device 105 that is implemented with a transparent or translucent display that allows the user to directly view the physical environment, compositing engine 227 may be omitted or unused in some circumstances, or may be incorporated in rendering engine 223. Although the example of FIG. 2 illustrates a rendering engine 223 that is separate from XR service 200, it should be appreciated that XR service 200 and rendering engine 223 may form a common service and/or that rendering operations for rendering content for display can be performed by the XR service 200. Although the example of FIG. 2 illustrates a rendering engine 223 that is separate from application 202, it should be appreciated that, in some implementations, application 202 may render content for display by display 154 without using a separate rendering engine. Although a single instance of the application 202 is depicted in FIG. 2, it is appreciated that multiple applications may be running concurrently on the electronic device 105, generating application data for rendering of respective UIs for display by display 154. In one or more implementations, compositing engine 227 may composite application data for multiple UIs of multiple applications for concurrent display.

In one or more implementations, the compositing engine 227 may be able to composite a portion of video images of the physical environment with virtual content (and/or a virtual environment) provided by the application 202. For example, the compositing engine 227 may receive hand tracking and/or skeletal tracking information that may be used to display the user's hands and/or arms in a virtual reality environment corresponding to the application 202.

Figure 3:
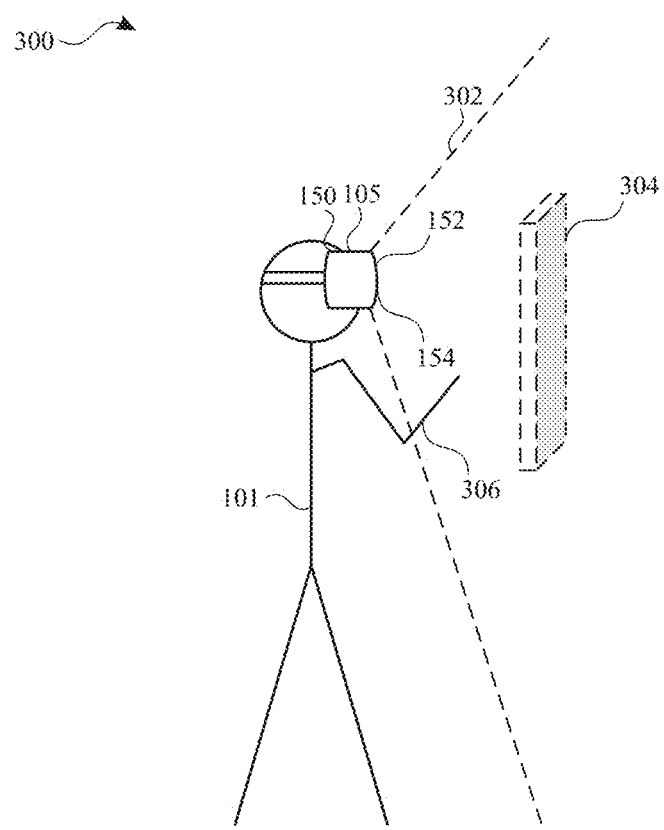
FIG. 3 illustrates an example electronic device displaying virtual reality content to a user in accordance with one or more implementations of the subject technology.

FIG. 3 illustrates an example electronic device 105 displaying virtual reality content to a user 101 in accordance with one or more implementations of the subject technology. The virtual reality content may be part of an immersive virtual environment and may include a virtual object 304, which may be rendered within a field of view 302 of the user 101. The user 101 may use one or more extremities, such as an arm 306, to interact with the virtual object 304.

In a virtual reality environment 300, detection of user 101 interaction with the virtual object 304 may be facilitated by a combination of sensory input, real-time tracking, machine learning algorithms, computer graphics, and the like. As a user 101 reaches out with an extremity, such as an arm 306, to interact with the virtual object 304, the electronic device 105 may capture (e.g., via the sensors 152) the movement of the arm 306.

The electronic device 105 may render a digital representation of the arm 306 within the virtual reality environment 300. In some implementations, the arm 306 may be rendered and/or displayed via pass-through video, where real-time footage captured by the sensors 152 (e.g., outward-facing cameras) of the electronic device 105 is layered onto the virtual environment. In some implementations, with the sensor data, the electronic device 105 may render a computer-generated image of the arm 306, which could be a realistic 3D model that closely resembles the arm 306. In some implementations, the electronic device 105 may render a different computer-generated object at a virtual position that corresponds to the physical position of the arm 306, based on the anchor points associated with the arm 306. For example, in a virtual game, the arm 306 might be rendered as a virtual tool or a stylized representation of the arm 306, moving and interacting with the virtual reality environment 300 in sync with the actual movements of the user 101.

Whether the electronic device 105 displays the pass-through video of the arm 306 in the virtual reality environment 300 may be decided by a system process (e.g., the rendering engine 223 and/or the compositing engine 227) running on the electronic device 105. Rather than an application process (e.g., the application 202) running on the electronic device 105 deciding whether the pass-through video of the arm 306 is displayed, the application process may express a preference for whether the arm 306 is displayed, which the system process may or may not apply.

For example, as shown in FIG. 3, the virtual object 304 may include a virtual keyboard and an input field for the user 101 to provide information to the electronic device 105. The electronic device 105 may override any preferences by the application process relating to whether the arm 306 is displayed. The electronic device 105 may decide to pass through images of the arm 306 or render a natural-looking representation of the arm 306 to improve the ease with which the user 101 may input information. The virtual object 304 may also or instead include alerts, notifications, pop-ups, system settings, or any other user interface elements within the field of view 302 of the user 101.

The electronic device 105 may also or instead provide to the application process arbitrary (e.g., anchor points indicating a random position of the arm 306) and/or pre-determined (e.g., anchor points indicating a position of the arm 306 that is out of view, such as behind the user 101) data relating to the position of the arm 306 to preserve the privacy of the user 101, such as when the user 101 is inputting information with the arm 306 and/or when the application has requested that the pass-through video of the arms not be displayed but the system process is not honoring that request. In this manner, the application process may not attempt to display its own representation of the user's arms since the application process believes that the user's arms are out of view. Meanwhile, the system process is still utilizing the data representing the actual position of the arm 306 to facilitate the user interface.

Figure 4:
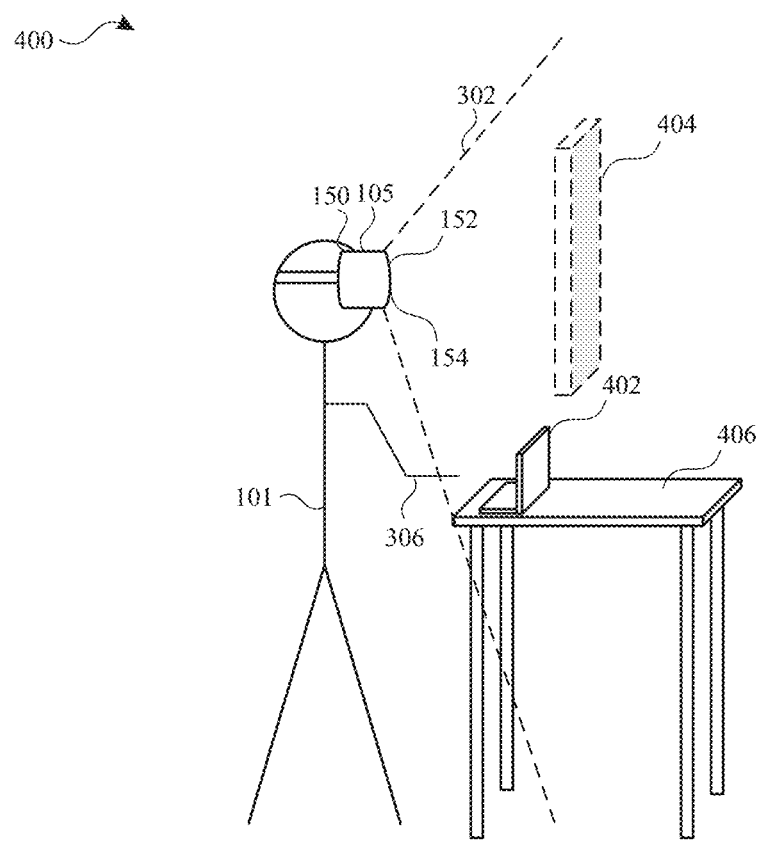
FIG. 4 illustrates an example electronic device displaying augmented reality content to a user in accordance with one or more implementations of the subject technology.

FIG. 4 illustrates an example electronic device 105 displaying augmented reality content to a user 101 in accordance with one or more implementations of the subject technology. The augmented reality content may include a virtual object 404, which may be rendered within a field of view 302 of the user 101. The augmented reality content may be rendered relative to one or more physical objects (e.g., a laptop 402 and a table 406) in a physical environment. The user 101 may use one or more extremities, such as an arm 306, to interact with the physical objects.

In an augmented reality environment 400, user 101 interaction with a physical object may be facilitated by a combination of sensory input, real-time tracking, machine learning algorithms, computer graphics, and the like. As a user 101 reaches out with an extremity, such as an arm 306, to interact with the laptop 402, the electronic device 105 may capture (e.g., via the sensors 152) the movement of the arm 306.

The electronic device 105 may render a digital representation of the arm 306 in the augmented reality environment 400. In some implementations, the arm 306 may be displayed using pass-through video, where real-time footage captured by the sensors 152 (e.g., outward-facing cameras) of the electronic device 105 is layered onto the virtual environment. In some implementations, with the sensor data, the electronic device 105 may render a computer-generated image of the arm 306. In some implementations, the electronic device 105 may render a different computer-generated object at a virtual position that corresponds to the physical position of the arm 306, based on the anchor points associated with the arm 306. For example, in a virtual game, the arm 306 might be rendered as a virtual tool or some other stylized representation of the arm 306, moving and interacting with the virtual reality environment 300 in sync with the actual movements of the user 101.

Whether the electronic device 105 displays the pass-through video of the arm 306 in the augmented reality environment 400 may be decided by a system process (e.g., the rendering engine 223 and/or the compositing engine 227) running on the electronic device 105. Rather than an application process (e.g., the application 202) running on the electronic device 105 deciding whether the pass-through video of the arm 306 is displayed, the application process may express a preference for whether the arm 306 is displayed, which the system process may or may not apply.

For example, as shown in FIG. 4, the virtual object 404 may be virtual display for media playback (e.g., to watch a movie). When performing media playback, the media playback application running on the electronic device 105 hide the extremities (e.g., the arm 306) of the user 101 and reduce distractions from the media by dimming the representation of the physical environment and rendering silhouettes of the extremities in a location corresponding to the extremities so the user 101 may still interact with the user interface of the electronic device 105. However, reducing distractions by altering how the user 101 views the physical environment may make interacting with the physical environment difficult. So, to facilitate the ability of the user 101 to effectively interact with the physical environment, a system process running on the electronic device 105 may override the preference of the media playback application and display the extremities of the user 101 when the electronic device 105 detects that the user 101 is attempting to use a physical object. As shown in FIG. 4, the electronic device 105 may detect that the user 101 is attempting to use the laptop 402 based on proximity of the user 101 to the laptop 402 (e.g., as determined via signal strength between the electronic device 105 and the laptop 402) and/or based on the position of the arm 306 reaching toward the laptop 402.

Figure 5:
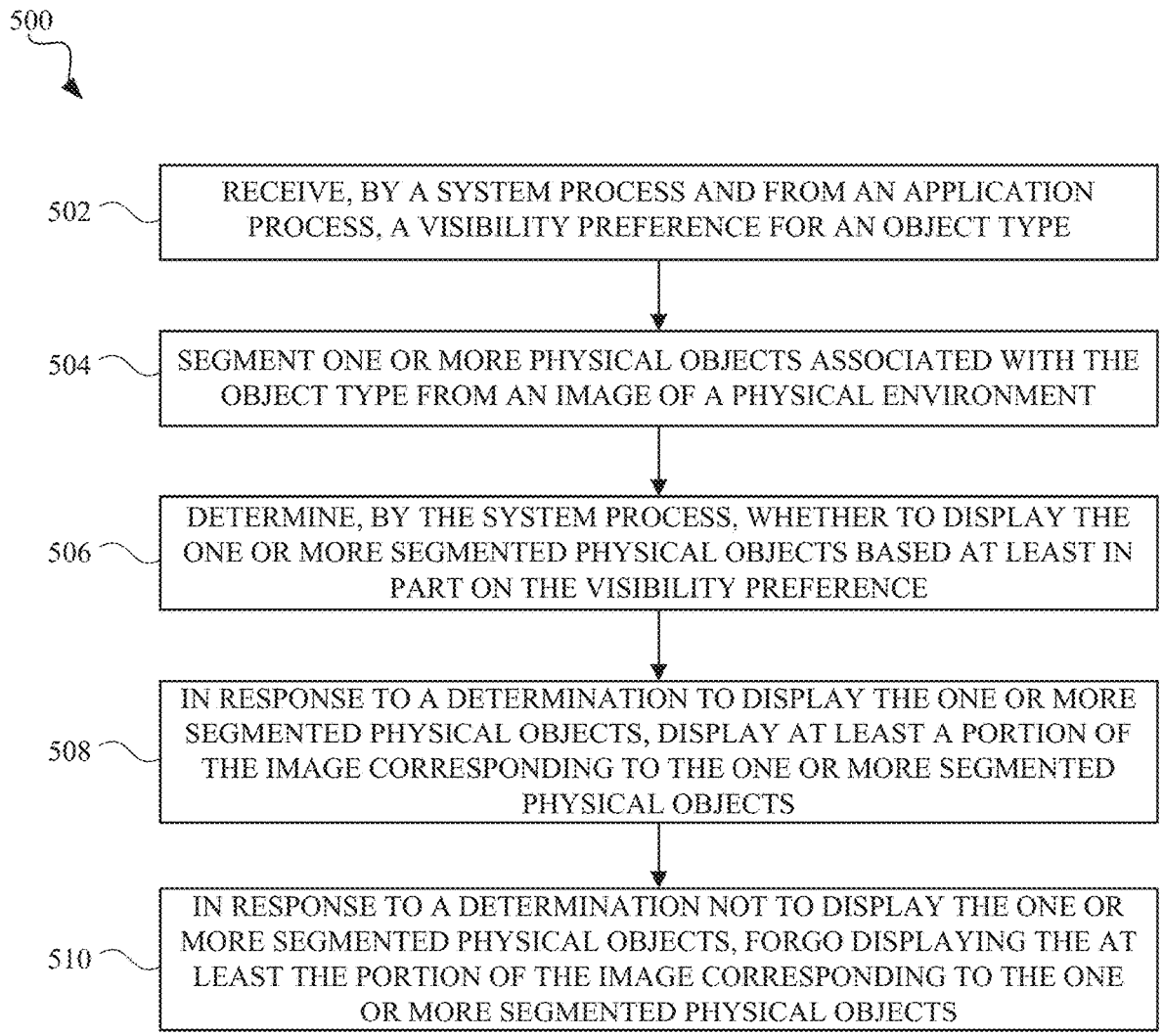
FIG. 5 illustrates a flow diagram of an example process for configuring extremity visibility in accordance with one or more implementations of the subject technology.

FIG. 5 illustrates a flow diagram of an example process 500 for configuring extremity visibility in accordance with implementations of the subject technology. For explanatory purposes, the process 500 is primarily described herein with reference to the electronic device 105 of FIG. 1. However, the process 500 is not limited to the electronic device 105 of FIG. 1, and one or more blocks (or operations) of the process 500 may be performed by one or more other components of other suitable devices, including the electronic device 104, the electronic device 110, and/or the electronic device 115. Further for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As illustrated in FIG. 5, at block 502, a system process (e.g., the rendering engine 223 and/or the compositing engine 227) of the electronic device 105 may receive, from an application process (e.g., the application 202), a visibility preference. A visibility preference from an application process may refer to a set of instructions or parameter that indicate whether one or more physical objects and/or types of objects should be displayed within the virtual environment (e.g., virtual reality environment 300, augmented reality environment 400, or any other XR environment). The type of objects may include the user's (e.g., the user 101) extremities (e.g., arm 306). It should be understood that the user's extremities may be referred to in the singular for purposes of description and one or more extremities are contemplated. Although the present disclosure may be discussed with respect to extremities of the user, it should also be understood that a visibility preference may be directed to any physical objects or types of physical objects that may be present, detected, and/or classified in the physical environment. For example, types of physical objects may include animals, tables, doors, windows, people, hands, arms, legs, feet, displays, computing devices, or generally any physical objects that may be detected and/or segmented from images of a physical environment. Thus, in one or more implementations, an application may specify different visibility preferences for different object types.

For example, an application might have a preference to show the user's real hands in some contexts (e.g., a virtual meeting), but hide them and/or replace them with virtual objects in other contexts (e.g., when displaying armored gloves holding a sword in a video game). The visibility preference may be set by a developer of the application or could be a setting that the user themselves can adjust. In some implementations, the visibility preference may be based on one or more other application and/or system settings (e.g., dark mode, accessibility text size, and the like) such that the visibility preference may be updated in response to changes in other related settings.

At block 504, the electronic device 105 may segment one or more portions of images of the physical environment that include and/or display one or more physical objects. The one or more images may be one or more video frames captured from a camera of the electronic device (e.g., cameras 150). The electronic device 105 may matte, crop, outline, highlight, or otherwise segment the portions of the one or more images that include the one or more physical objects, such as using one or more machine learning models trained to detect particular types of physical objects in images.

In some implementations, the electronic device 105 may also generate anchor points corresponding to one or more portions of a physical object. An anchor point may include 3-dimensional coordinates that maps the physical location of the portion of the physical object onto the XR environment. Anchor points may continuously be updated in real-time as the physical object moves, allowing the electronic device 105 to maintain a consistently accurate representation of the physical object within the digital space. The generated anchor points may serve as reference points for a variety of XR operations, such as rendering a virtual object, overlaying virtual content (e.g., virtual objects) onto the physical object, hiding the physical object, and detecting interactions between the physical object and virtual content.

In some implementations, the electronic device 105 may generate false anchor points that map to a physical location that is not the actual physical location of the physical object. The false anchor points may be provided to an application process, for example, for the application process to render extremities of the user in an arbitrary or pre-determined position (e.g., out of view position) while preserving the user's privacy in certain scenarios.

At block 506, the system process of the electronic device 105 may determine whether to display an extremity based at least in part on the visibility preference. For instance, the application process may dictate (via the visibility preference) that user's extremities should be hidden in a particular context, or alternatively, be displayed. The visibility preference may be passed on to the system process, which may typically respect the visibility preference and adjust the rendering engine accordingly. However, there may be instances where the system process might override the preference set by the application process. This override may generally be in response to one or more pre-determined conditions that may be of higher importance than the application's preference. The pre-determined conditions may relate to considerations around user privacy or the user experience.

For example, in some implementations, the system process might override the application's preference of hiding the user's extremities when a virtual input interface (e.g., a keyboard) is being displayed. Accordingly, the system process may cause the user's extremities to be displayed to help the user interact with the virtual input interface. In some implementations, hiding the user's extremities may cause the application process to receive anchor points for the application process to render virtual extremities. Providing anchor points to the application process while the user is inputting potentially sensitive information (e.g., a password) may reveal to the application the information input by the user. Accordingly, the system process may override the application's preference and may withhold anchor points or provide false anchor points (e.g., anchor points that do not accurately represent the position of the user's extremities) to the application process to preserve the user's privacy.

In some implementations, the system process may override the application's preference to hide the user's extremities if it detects that displaying the extremities would enhance a user's physical interactions. For instance, when the user is using or attempting to use a keyboard (or any other physical object), the system process might choose to display the user's actual hands alongside the keyboard to facilitate the use of the keyboard, thereby improving the user's control and overall experience. In other instances, when the electronic device 105 is passing through images (e.g., video frames) of the physical environment, the system process might choose to display the user's actual hands to fully pass-through images of the physical environment.

In some implementations, the system process may override the application's preference to hide the user's extremities if it detects that displaying the extremities would enhance a user's virtual interactions. For instance, in a VR drawing application, even if the app's default preference is to replace the user's hand with a drawing tool, the system process might choose to display the user's actual hand alongside the tool when precision is required, thereby improving the user's control and overall experience.

In some implementations, the electronic device 105 may receive preferences from multiple applications and decide which preference to implement (e.g., to provide to a compositing engine 227). The decision may be based on conditions such as whether an application corresponding to a preference is in view (e.g., the view frustum) of the user, whether an application corresponding to a preference is a foreground application, whether an application corresponding to a preference is presenting a media file (e.g., playback mode), whether any system settings (e.g., accessibility settings) override the application preference, and the like.

In some implementations, the electronic device 105 may receive multiple preferences from an application and decide which preference to implement (e.g., to provide to a compositing engine 227). The decision may be based on conditions such as the aspect (e.g., interface) of the application in view (e.g., the view frustum) of the user, the aspect of the application in focus, and the like.

If the system process determines that it is not to display the physical object, the process 500 may proceed to block 508. Otherwise, the process 500 may proceed to block 510.

At block 508, the electronic device 105 displays at least a portion of the image corresponding to the one or more segmented physical objects. The at least a portion of the image corresponding to the one or more segmented physical objects may be composited with the rest of the image and/or virtual content (e.g., one or more virtual objects, such as the laptop 402 and the table 406).

In some implementations, if the physical object was not previous displayed, displaying the physical object may include a transition period whereby a virtual object (e.g., animated extremity) is hidden (e.g., fades out) and the corresponding physical object (e.g., actual extremity) is displayed (e.g., fades in) by the end of the transition period.

At block 510, the electronic device 105 may forgo displaying (e.g., hide) the physical object.

In some implementations, if the physical object (e.g., actual extremity) was previous displayed, forgoing displaying the extremity may include a transition period whereby the physical object is not visible (e.g., fades out) and/or a corresponding virtual object is displayed (e.g., fades in) by the end of the transition period.

As described above, aspects of the subject technology may include the collection of data. The present disclosure contemplates that in some instances, this collected data may include personal information data that uniquely identifies or can be used to identify a specific person. Such personal information data can include demographic data, location-based data, online identifiers, telephone numbers, email addresses, home addresses data, image data, audio data, environment data, or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing various user interface modes of a user interface of an application running on an electronic device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing various user interface modes of a user interface of an application running on an electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 6:
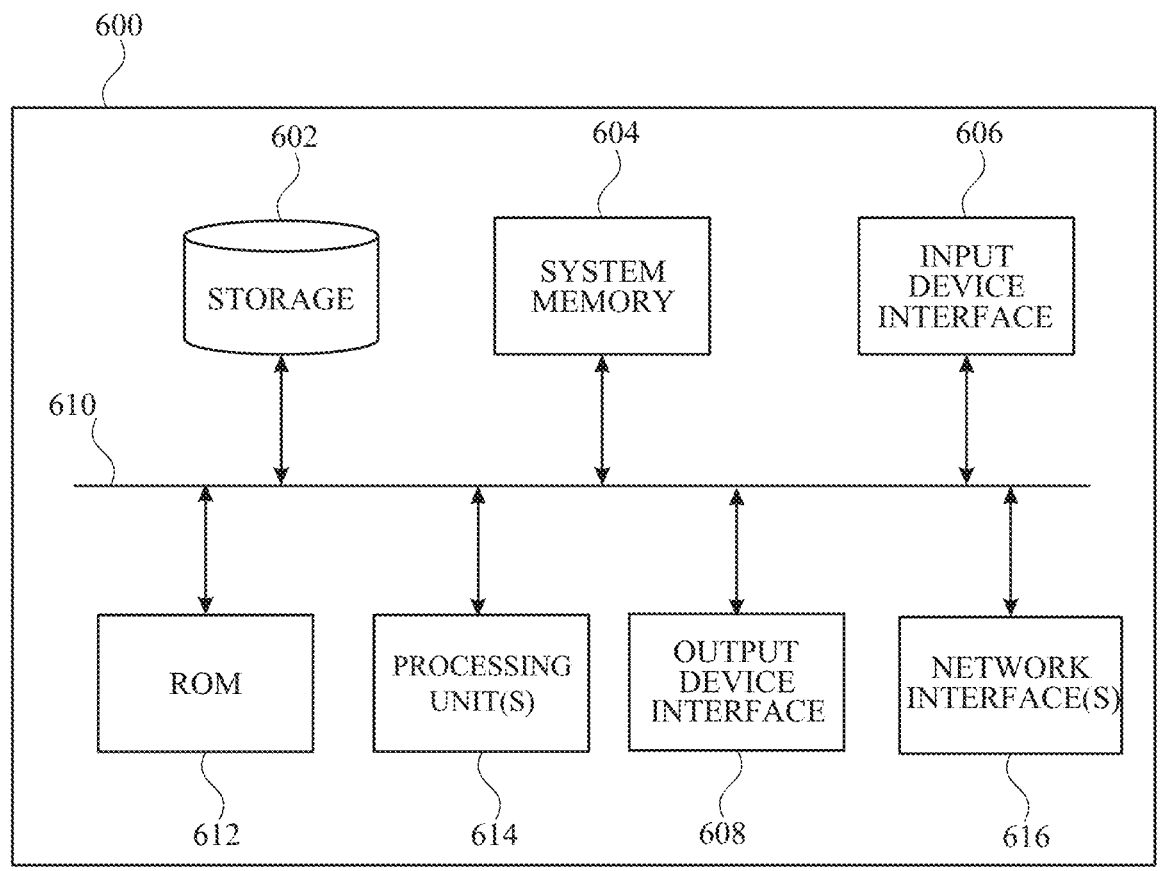
FIG. 6 illustrates an example computing device with which aspects of the subject technology may be implemented.

FIG. 6 illustrates an example computing device with which aspects of the subject technology may be implemented in accordance with one or more implementations. The computing device 600 can be, and/or can be a part of, any computing device or server for generating the features and processes described above, including but not limited to a laptop computer, a smartphone, a tablet device, a wearable device such as a goggles or glasses, and the like. The computing device 600 may include various types of computer-readable media and interfaces for various other types of computer-readable media. The computing device 600 includes a permanent storage device 602, a system memory 604 (and/or buffer), an input device interface 606, an output device interface 608, a bus 610, a ROM 612, one or more processing unit(s) 614, one or more network interface(s) 616, and/or subsets and variations thereof.

The bus 610 collectively represents all system, peripheral, and chipset buses that communicatively connect the numerous internal devices of the computing device 600. In one or more implementations, the bus 610 communicatively connects the one or more processing unit(s) 614 with the ROM 612, the system memory 604, and the permanent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations.

The ROM 612 stores static data and instructions that are needed by the one or more processing unit(s) 614 and other modules of the computing device 600. The permanent storage device 602, on the other hand, may be a read-and-write memory device. The permanent storage device 602 may be a non-volatile memory unit that stores instructions and data even when the computing device 600 is off. In one or more implementations, a mass-storage device (such as a magnetic or optical disk and its corresponding disk drive) may be used as the permanent storage device 602.

In one or more implementations, a removable storage device (such as a flash drive and its corresponding solid state drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 614 may need at runtime. In one or more implementations, the processes of the subject disclosure are stored in the system memory 604, the permanent storage device 602, and/or the ROM 612. From these various memory units, the one or more processing unit(s) 614 retrieves instructions to execute and data to process in order to execute the processes of one or more implementations.

The bus 610 also connects to the input and output device interfaces 606 and 608. The input device interface 606 enables a user to communicate information and select commands to the computing device 600. Input devices that may be used with the input device interface 606 may include, for example, alphanumeric keyboards and pointing devices (also called "cursor control devices"). The output device interface 608 may enable, for example, the display of images generated by computing device 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 610 also couples the computing device 600 to one or more networks and/or to one or more network nodes through the one or more network interface(s) 616. In this manner, the computing device 600 can be a part of a network of computers (such as a LAN, a wide area network ("WAN"), or an Intranet, or a network of networks, such as the Internet. Any or all components of the computing device 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving, by a system process and from an application process, a visibility preference for an object type;
   segmenting one or more physical object representations associated with the object type from an image of a physical environment;
   determining, by the system process, whether to display the one or more segmented physical objects based at least in part on the visibility preference;
   in response to a determination to display the one or more segmented physical objects, displaying at least a portion of the image corresponding to the one or more segmented physical objects; and in response to a determination not to display the one or more segmented physical objects, forgoing displaying the at least the portion of the image corresponding to the one or more segmented physical objects.

2. The method of claim 1, further comprising:
in response to the determination to display the one or more segmented physical objects and the visibility preference indicating a preference to not display the one or more segmented physical objects:
generating one or more anchor points representing a physical position different from a physical position of the one or more physical objects; and
providing at least one of the one or more anchor points to the application process for displaying a virtual object at a virtual position corresponding to the one or more anchor points.

3. The method of claim 1, further comprising:
in response to the determination to display the one or more segmented physical objects and the visibility preference indicating a preference to display the one or more segmented physical objects:
generating one or more anchor points representing a physical position of the one or more physical objects; and
providing at least one of the one or more anchor points to the application process for displaying a virtual object at a virtual position corresponding to the one or more anchor points.

4. The method of claim 1, further comprising:
updating, by the system process, one or more settings; and
in response to updating the one or more settings, receiving, by the system process and from the application process, an updated visibility preference.

5. The method of claim 1, wherein determining whether to display the one or more segmented physical objects comprises:
determining whether an input interface is being displayed; and
generating the determination to display the one or more segmented physical objects in response to determining that the input interface is being displayed.

6. The method of claim 1, wherein determining whether to display the one or more segmented physical objects comprises:
determining whether a physical position of the one or more segmented physical objects correspond to interacting with another physical object; and
generating the determination to display the one or more segmented physical objects in response to determining that the physical position of the one or more segmented physical objects correspond to interacting with the other physical object.

7. The method of claim 1, wherein determining whether to display the one or more segmented physical objects comprises:
determining whether an electronic display associated with the system process is presenting one or more images of a physical environment associated with a physical position of the one or more physical objects; and
generating the determination to display the one or more segmented physical objects in response to determining that the electronic display is presenting one or more images of the physical environment.

8. The method of claim 1, wherein display of the one or more segmented physical objects is based on a transition period such that the one or more segmented physical objects is fully displayed by completion of the transition period.

9. The method of claim 1, further comprising:
receiving, by the system process, another visibility preference;
determining, by the system process, a selected visibility preference from the visibility preference and the other visibility preference based on one or more conditions; and
determining, by the system process, whether to display the one or more segmented physical objects based at least in part on the selected visibility preference.

10. The method of claim 1, wherein determining whether to display the one or more segmented physical objects comprises overriding the visibility preference in response to satisfying one or more pre-determined conditions.

11. A device comprising:
a memory; and
a processor configured to:
receive, by a system process and from an application process, a visibility preference for an object type;
segment one or more physical objects associated with the object type from an image of a physical environment;
determine, by the system process, whether to display the one or more segmented physical objects based at least in part on the visibility preference;
in response to a determination to display the one or more segmented physical objects, display at least a portion of the image corresponding to the one or more segmented physical objects; and
in response to a determination not to display the one or more segmented physical objects, forgo displaying the at least the portion of the image corresponding to the one or more segmented physical objects.

12. The device of claim 11, wherein the processor is further configured to:
in response to the determination to display the one or more segmented physical objects and the visibility preference indicating a preference to not display the one or more segmented physical objects:
generate one or more anchor points representing a physical position different from a physical position of the one or more physical objects; and
provide at least one of the one or more anchor points to the application process for displaying a virtual object at a virtual position corresponding to the one or more anchor points.

13. The device of claim 11, wherein the processor is further configured to:
in response to the determination to display the one or more segmented physical objects and the visibility preference indicating a preference to display the one or more segmented physical objects:
generate one or more anchor points representing a physical position of the one or more physical objects; and
provide at least one of the one or more anchor points to the application process for displaying a virtual object at a virtual position corresponding to the one or more anchor points.

14. The device of claim 11, wherein the processor is further configured to:
update, by the system process, one or more settings; and
in response to updating the one or more settings, receive, by the system process and from the application process, an updated visibility preference.

15. The device of claim 11, wherein determining whether to display the one or more segmented physical objects comprises:

determining whether an input interface is being displayed; and generating the determination to display the one or more segmented physical objects in response to determining that the input interface is being displayed.

16. The device of claim 11, wherein determining whether to display the one or more segmented physical objects comprises:

determining whether a physical position of the one or more segmented physical objects correspond to interacting with another physical object; and generating the determination to display the one or more segmented physical objects in response to determining that the physical position of the one or more segmented physical objects correspond to interacting with the other physical object.

17. The device of claim 11, wherein determining whether to display the one or more segmented physical objects comprises:

determining whether an electronic display associated with the system process is presenting one or more images of a physical environment associated with a physical position of the one or more physical objects; and generating the determination to display the one or more segmented physical objects in response to determining that the electronic display is presenting one or more images of the physical environment.

18. The device of claim 11, wherein display of the one or more segmented physical objects is based on a transition period such that the one or more segmented physical objects is fully displayed by completion of the transition period.

19. The device of claim 11, wherein the processor is further configured to:

receive, by the system process, another visibility preference;

determine, by the system process, a selected visibility preference from the visibility preference and the other visibility preference based on one or more conditions; and determine, by the system process, whether to display the one or more segmented physical objects based at least in part on the selected visibility preference.

20. A non-transitory computer-readable medium storing instructions that, when executed by a processor, causes the processor to perform operations comprising:

receiving, by a system process and from an application process, a visibility preference for an object type;

segmenting one or more physical objects associated with the object type from an image of a physical environment;

determining, by the system process, whether to display the one or more segmented physical objects based at least in part on the visibility preference;

in response to a determination to display the one or more segmented physical objects, displaying at least a portion of the image corresponding to the one or more segmented physical objects; and in response to a determination not to display the one or more segmented physical objects, forgoing displaying that at least a portion of the image corresponding to the one or more segmented physical objects.

\* \* \* \* \*